(12) United States Patent
Hester et al.

(10) Patent No.: US 10,511,100 B2
(45) Date of Patent: Dec. 17, 2019

(54) INKJET PRINTED FLEXIBLE VAN ATTA ARRAY SENSOR

(71) Applicants: GEORGIA TECH RESEARCH CORPORATION, Atlanta, GA (US); Jimmy Hester, Atlanta, GA (US); Emmanouil Tentzeris, Atlanta, GA (US)

(72) Inventors: Jimmy Hester, Atlanta, GA (US); Emmanouil Tentzeris, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 16/069,440

(22) PCT Filed: Jan. 27, 2017

(86) PCT No.: PCT/US2017/015413
§ 371 (c)(1),
(2) Date: Jul. 11, 2018

(87) PCT Pub. No.: WO2017/136242
PCT Pub. Date: Aug. 10, 2017

(65) Prior Publication Data
US 2019/0020122 A1     Jan. 17, 2019

Related U.S. Application Data
(60) Provisional application No. 62/290,231, filed on Feb. 2, 2016.

(51) Int. Cl.
*H01Q 21/06* (2006.01)
*H04B 1/40* (2015.01)
(Continued)

(52) U.S. Cl.
CPC ............ *H01Q 21/065* (2013.01); *H01Q 1/22* (2013.01); *H01Q 1/2225* (2013.01); *H01Q 1/38* (2013.01);
(Continued)

(58) Field of Classification Search
CPC ...... H01Q 21/065; H01Q 1/22; H01Q 1/2225; H01Q 1/38; H01Q 9/0407; H01Q 3/46; H04B 1/40
See application file for complete search history.

(56) References Cited

U.S. PATENT DOCUMENTS 2,908,002 A * 10/1959 Van Atta ............. H01Q 3/2647
343/776
3,496,570 A    2/1970 Lewis
(Continued)

OTHER PUBLICATIONS

Yang et al.: "A Novel Conformal RFID-Enabled Module Utilizing Inkjet-Printed Antennas and Carbon Nanotubes for Gas-Detection Applicatoins"; May 29, 2009; IEEE Antennas and Wireless Propagation Letters, vol. 8, pp. 653-656.
(Continued)

*Primary Examiner* — Daniel Luke
(74) *Attorney, Agent, or Firm* — Bryan W. Bockhop; Bockhop Intellectual Property Law, LLC

(57) ABSTRACT

A radio-frequency responsive device includes a dielectric substrate having a first side and an opposite second side. A Van Atta array reflector is printed on the first side of the dielectric substrate. The Van Atta array reflector reflects an incident signal at a predetermined radio frequency at an incident angle. A conductive ground layer is disposed adjacent the second side of the dielectric substrate. In a method of making a radio-frequency responsive device, a Van Atta array reflector is printed on a first side of a dielectric substrate. A conductive ground layer is applied to a second
(Continued)

side of the dielectric substrate, in which the second side is opposite the first side.

17 Claims, 3 Drawing Sheets

(51) Int. Cl.
  *H01Q 1/22*    (2006.01)
  *H01Q 1/38*    (2006.01)
  *H01Q 3/46*    (2006.01)
  *H01Q 9/04*    (2006.01)

(52) U.S. Cl.
  CPC ............. *H01Q 3/46* (2013.01); *H01Q 9/0407* (2013.01); *H04B 1/40* (2013.01)

(56) References Cited

U.S. PATENT DOCUMENTS

| | | | |
|---|---|---|---|
| 5,254,997 A * | 10/1993 | Cohn | G01S 13/751 342/44 |
| 6,008,770 A * | 12/1999 | Sugawara | H01Q 13/085 343/767 |
| 8,104,358 B1 | 1/2012 | Jai et al. | |
| 8,378,893 B2 * | 2/2013 | Harokopus | H01Q 1/523 343/700 MS |
| 2002/0136664 A1 * | 9/2002 | Lee | G01N 27/121 422/98 |
| 2004/0058172 A1 * | 3/2004 | Summers | B32B 15/08 428/473.5 |
| 2008/0150823 A1 * | 6/2008 | Mohammadian | H01Q 1/38 343/795 |
| 2010/0196744 A1 | 8/2010 | Tucholski et al. | |
| 2012/0297888 A1 | 11/2012 | Nagarajan et al. | |
| 2015/0116172 A1 * | 4/2015 | Fontecchio | H01Q 1/2208 343/793 |

OTHER PUBLICATIONS

Amin et al.: "Development of a Low Cost Printable Chipless RFID Humidity Sensor"; Aug. 15, 2013; IEEE Sensors Journal, vol. 14, No. 1, pp. 140-149.

Kim et al.: "Low-Cost Inkjet-Printed Fully Passive RFID Tags for Calibration-Free Capacitive/Haptic Sensor Applications"; Nov. 3, 2014; IEEE Sensors Journal, vol. 15, No. 6, pp. 3135-3145.

* cited by examiner

INKJET PRINTED FLEXIBLE VAN ATTA
ARRAY SENSOR

CROSS-REFERENCE TO RELATED
APPLICATION(S)

This application claims the benefit of U.S. Provisional Patent Application Ser. No. 62/290,231, filed Feb. 2, 2016, the entirety of which is hereby incorporated herein by reference.

STATEMENT OF GOVERNMENT INTEREST

This invention was made with government support under agreement No. HDTRA1-14-1-0001, awarded by the Department of Defense. The government has certain rights in the invention.

BACKGROUND OF THE INVENTION

1. Field of the Invention

The present invention relates to backscattering sensors and, more specifically, to an inkjet printed backscattering sensor.

2. Description of the Related Art

Certain types of sensors, such as radio frequency identification (RFID) tags receive a querying signal from a querying device and use some of the energy in the signal to generate a response signal. The response signal may have a unique identification modulated thereon, which is sensed by the querying device and is used to identify the queried tag. Some types of sensors employ ambient sensor elements that sense an aspect of the environment into which they are placed. Data from such sensors can be modulated onto the response signal so as to provide environmental information to the querying device.

Manufacturing of many types of identification and sensor tags can involve several steps, including antenna application and chip affixation. Also, many types of tags experience substantial signal loss when applied to curved surfaces. Additionally, many tags tend to have a relatively short range.

Therefore, there is a need for a tag that has a relatively long range.

Therefore, there is also a need for a tag that can be manufactured with a minimal number of steps.

Therefore, there is also a need for a tag that experiences minimal signal loss when applied to curved surfaces.

SUMMARY OF THE INVENTION

The disadvantages of the prior art are overcome by the present invention which, in one aspect, is a radio-frequency responsive device that includes a dielectric substrate having a first side and an opposite second side. A Van Atta array reflector is printed on the first side of the dielectric substrate. The Van Atta array reflector reflects an incident signal at a predetermined radio frequency at an incident angle. A conductive ground layer is disposed adjacent the second side of the dielectric substrate.

In another aspect, the invention is a radio-frequency responsive tag that includes a polyimide film substrate having a first side and an opposite second side. A Van Atta array reflector is printed on the first side of the polyimide film substrate and reflects an incident signal at a predetermined radio frequency at an incident angle. The Van Atta array reflector includes a plurality of linear antenna array pairs. Each antenna array pair includes two antenna arrays that are electrically coupled to each other and that are spaced apart from each other so that the antenna array pairs form a reflected beam in response to an incident signal that is emitted in a direction corresponding to a source of the incident signal. A conductive ground layer is disposed adjacent the second side of the polyimide film substrate.

In yet another aspect, the invention is a method of making a radio-frequency responsive device, in which a Van Atta array reflector is printed on a first side of a dielectric substrate. A conductive ground layer is applied to a second side of the dielectric substrate, in which the second side is opposite the first side.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF
THE DRAWINGS

Figure 1:
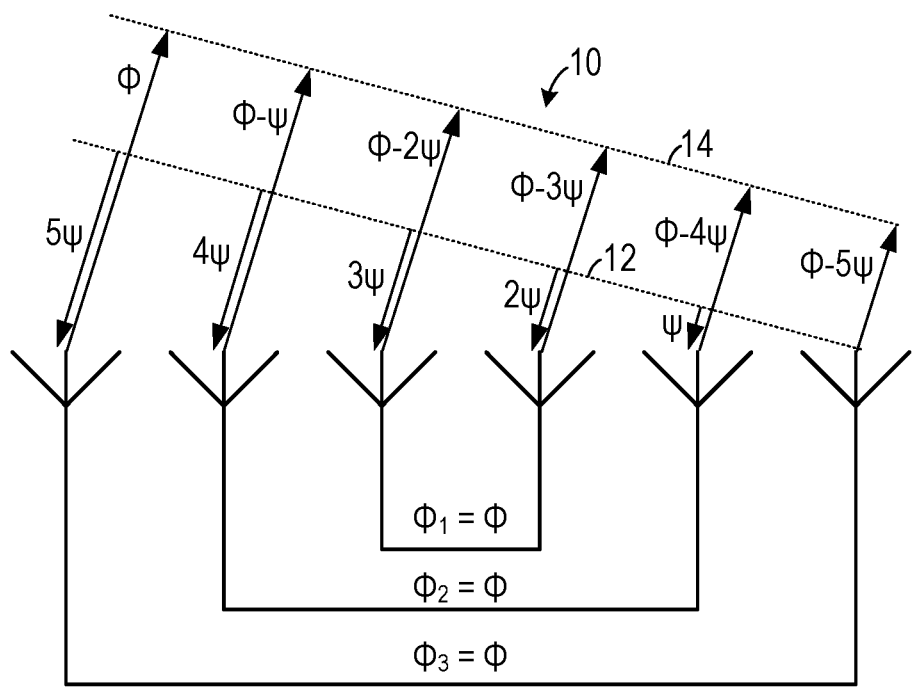
FIG. 1 is a schematic diagram of a prior art Van Atta array reflector.

DETAILED DESCRIPTION OF THE
INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, an existing Van-Atta reflectarray 10, includes an array of antennas, interconnected in symmetrical pairs (with reference to an axis or center of symmetry, in the middle of the structure). When all of the connecting lines are of identical electrical lengths, the structure induces in-phase re-emission of a received wave 14 in the same direction as the impinging reader wave 12. The boresight of this high gain structure is therefore consistently directed towards the reader, regardless of its position, within a wide angular range. This enables the Van-Atta structure with a unique combination of high and theoretically isotropic radar cross section (RCS) and thus the trade-off between high RCS (for large structures) and isotropic RCS behavior (for small structures) no longer applies. Additionally, Van Atta reflectarrays exhibit cross-polarization, in which the reflected signal is cross polarized with respect to the impinging reader wave. As a result, such a structure can offer large signal to interference and noise isolation thanks to both high RCS and polarization discrimination, while also being detectable from a wide range of directions.

Figure 2A:
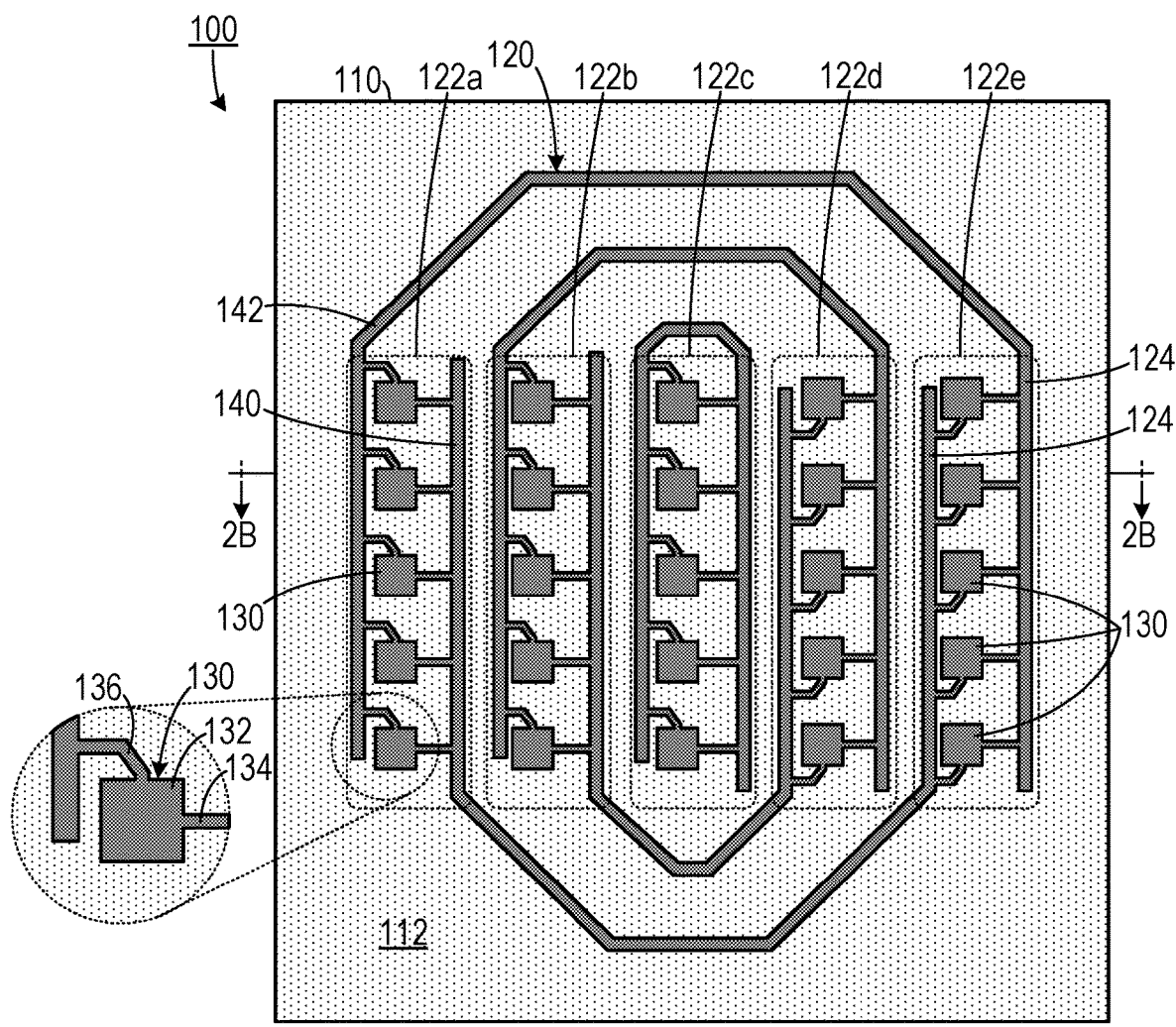
FIG. 2A is a plan view of one embodiment of a printed Van Atta array reflector.
Figure 2B:
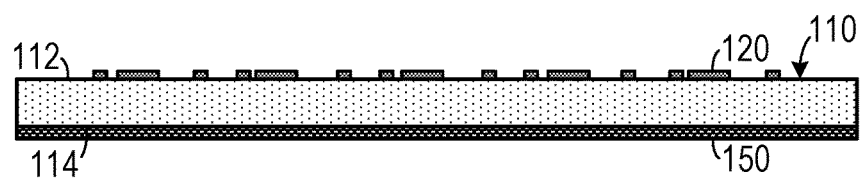
FIG. 2B is a cross-sectional view of the Van Atta array reflector shown in FIG. 2A, taken along line 2B-2B.
Figure 2C:
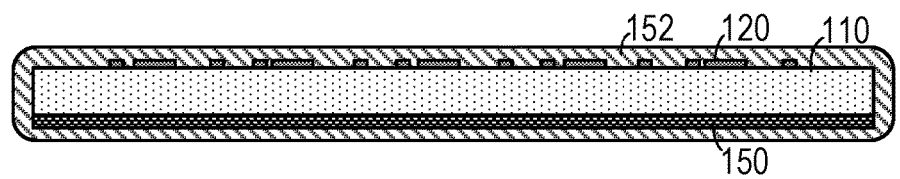
FIG. 2C is a cross sectional view of the Van Atta array reflector shown in FIG. 2A in which a protective envelope encases the Van Atta array reflector.

As shown in FIGS. 2A-2C, one embodiment of a radio-frequency responsive device 100 includes a dielectric substrate 110 having a first side 112 and an opposite second side 114. The dielectric substrate 110 can include a flexible polyimide film (which in one experimental embodiment, 5-mil-thick DuPont Kapton HN was employed), which has a humidity-dependent permittivity. A Van Atta array reflector 120 is printed, such as with an inkjet printer (which in one experimental embodiment was a Dimatix DMP2830 inkjet-printer), on the first side 112 of the dielectric substrate 110. The Van Atta array reflector 120 is made from conductive ink (in one experimental embodiment, silver nanoparticle ink available from Suntronic was employed) and reflects an incident signal at a predetermined radio frequency at an incident angle. A conductive ground layer 150 (such as a layer of copper) is disposed adjacent the second side 114 of the dielectric substrate 110. In some applications, a protective layer 152 can be disposed on the dielectric substrate and the Van Atta array reflector.

The Van Atta array reflector 120 includes (in the embodiment shown) five linear patch antennas 122a-122e. Two of the linear patch antennas 122d and 122e are oriented 180° from the remaining linear patch antennas 122a, 122b, and 122c to make wire lengths shorter. Each linear patch antenna includes a plurality of patch antenna elements 130, each having a first port 134 extending outwardly therefrom in a first direction and a second port 136 extending outwardly therefrom in a second direction that is orthogonal to the first direction. Each first port 134 is connected to a conductive line 124 that is electrically coupled to all of the first ports 134 of that array and that is electrically coupled to all of the second ports 136 of an array that is spaced apart from that array. Thus, in the embodiment shown, array 122a is electrically coupled to array 122e and array 122b is electrically coupled to array 122d. Array 122c is not coupled to any other arrays in this example. The wire lengths are chosen so that the phase relations between the emitted signals from each array are such that they add constructively in the direction of the incoming signal. Because port 136 is orthogonal to port 134, the reflected signal has a polarization that is different from the polarization of the incident signal—which allows querying devices to distinguish between an actual returned signal and a backscatter signal more easily.

Figure 3:
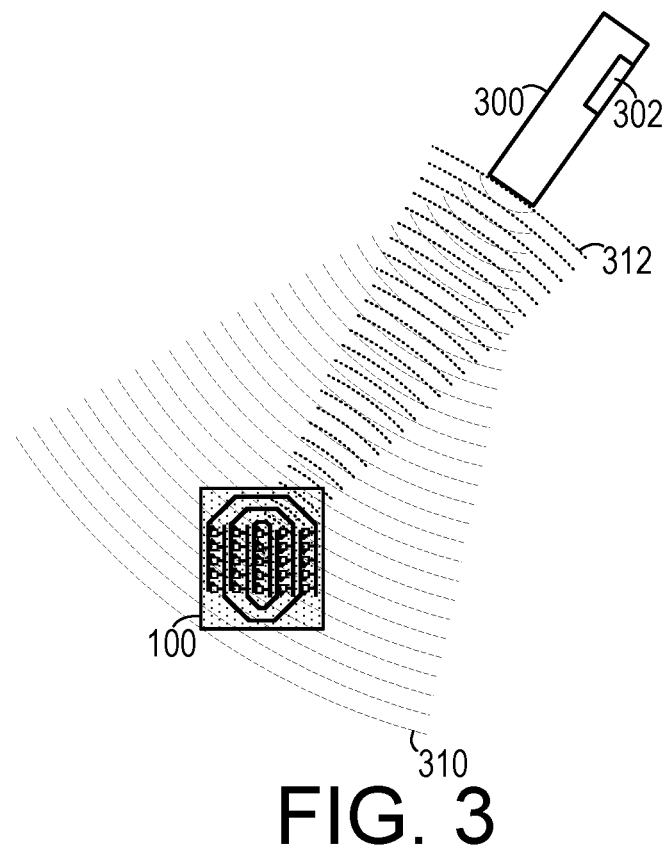
FIG. 3 is a schematic diagram showing a Van Atta array reflector being queried by a querying device.

As shown in FIG. 3, a querying device 300 can generate an outgoing signal 310 generally aimed at a radio-frequency responsive device 100. The radio-frequency responsive device 100 then backscatters a reflected return signal 312 that is directed in the direction of the querying device 300. Because of the directional reflection of the return signal 312, the device is relatively insensitive to angular offsets between the querying device 300 and the surface of the radio-frequency responsive device 100, as well as the curvature of the surface to which the radio-frequency responsive device 100 is applied.

In one embodiment, the querying device 300 can include a circuit 302 that calculates humidity surrounding the radio-frequency responsive device 100. This can be accomplished because the permittivity of the substrate in the radio-frequency responsive device 100 can be humidity-dependent (such as when the substrate includes a polyimide film) and the characteristics of the reflected return signal 312 can be correspondingly humidity dependent. Given that the radio-frequency responsive device 100 is highly directional, it can have a long range (which in one experimental embodiment was 30 m).

Figure 4:
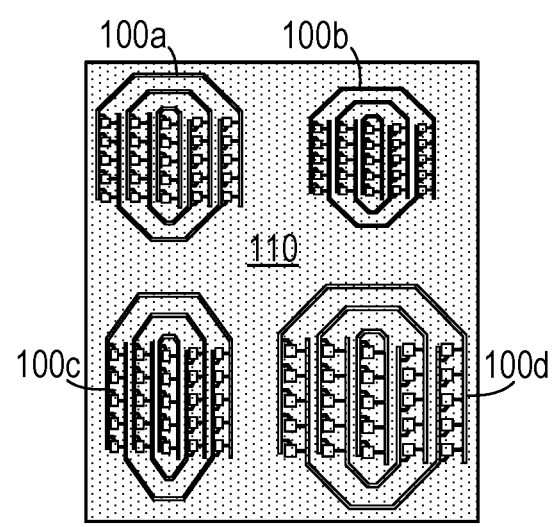
FIG. 4 is a schematic diagram showing a plurality of Van Atta array reflectors configured as an identifying tag.

In one embodiment, as shown in FIG. 4, a plurality of radio-frequency responsive devices 100a-100d can be disposed on a substrate 110. The radio-frequency responsive devices 100a-100d can have different physical dimensions so as to be tuned to different frequencies. In querying the tag, the querying device can transmit a range of frequencies and detect the frequencies that have been responded to. If a querying frequency results in a returned signal, then a logical "1" can be associated with that frequency and if a querying frequency does not result in a returned signal, then a logical "0" can be associated with that frequency. (Additional data values per tag can be achieved by sensing time delay of the returned signals.) Thus, selecting the dimensions of radio-frequency responsive devices on a tag can allow one to identify the tag uniquely. Since the tag is printed with an inkjet printer on a standard substrate and no additional components are required, unique identifying tags can be printed inexpensively as needed.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A radio-frequency responsive device, comprising:
   (a) a dielectric substrate having a first side and an opposite second side;
   (b) a Van Atta array reflector printed on the first side of the dielectric substrate that reflects an incident signal at a predetermined radio frequency at an incident angle; and
   (c) a conductive ground layer disposed adjacent the second side of the dielectric substrate,
      wherein the Van Atta array comprises a plurality of linear antenna array pairs, each antenna array pair including two antenna arrays that are electrically coupled to each other and that are spaced apart from each other so that the antenna array pairs form a reflected beam in response to an incident signal that is emitted in a direction corresponding to a source of the incident signal, and
      wherein each linear antenna array includes a plurality of patch antenna elements, each patch antenna element including a first port that is electrically coupled to a first wire and a second port, disposed orthogonally to the first port, that is electrically coupled to a second wire.

2. The device of claim 1, wherein the dielectric substrate comprises a flexible material.

3. The device of claim 2, wherein the flexible material comprises a polyimide film.

4. The device of claim 1, wherein the first wire of a first linear antenna array in an antenna array pair is electrically coupled to the first wire of a second linear antenna array in the antenna array pair and wherein the second wire of the first linear antenna array in the antenna array pair is electrically coupled to the second wire of the second linear antenna array in the antenna array pair.

5. The device of claim 1, wherein the Van Atta array reflector is configured to generate a reflected signal in response to an incident signal in which the reflected signal has a polarization that is different from a polarization of the incident signal.

6. The device of claim 1, further comprising a protective layer disposed on the dielectric substrate and the Van Atta array reflector.

7. A radio-frequency responsive tag, comprising:
(a) a polyimide film substrate having a first side and an opposite second side;
(b) a Van Atta array reflector printed on the first side of the polyimide film substrate that reflects an incident signal at a predetermined radio frequency at an incident angle, the Van Atta array reflector including a plurality of linear antenna array pairs, each antenna array pair including two antenna arrays that are electrically coupled to each other and that are spaced apart from each other so that the antenna array pairs form a reflected beam in response to an incident signal that is emitted in a direction corresponding to a source of the incident signal; and
(c) a conductive ground layer disposed adjacent the second side of the polyimide film substrate,
wherein each linear antenna array includes a plurality of patch antenna elements, each patch antenna element including a first port that is electrically coupled to a first wire and a second port, disposed orthogonally to the first port, that is electrically coupled to a second wire, wherein the first wire of a first linear antenna array in an antenna array pair is electrically coupled to the first wire of a second linear antenna array in the antenna array pair and wherein the second wire of the first linear antenna array in the antenna array pair is electrically coupled to the second wire of the second linear antenna array in the antenna array pair.

8. The tag of claim 7, further comprising a circuit that detects humidity as a function of detected permittivity of the polyimide film.

9. The tag of claim 7, further comprising a plurality of Van Atta array reflectors wherein each of the plurality of Van Atta array reflectors has a unique characteristic response to a querying signal so that the plurality of Van Atta array reflectors is uniquely identifiable based on the unique characteristic response.

10. A method of making a radio-frequency responsive device, comprising the steps of:

(a) printing a Van Atta array reflector on a first side of a dielectric substrate; and
(b) applying a conductive ground layer to a second side of the dielectric substrate, the second side being opposite the first side,
wherein the step of printing a Van Atta array comprises printing a plurality of linear antenna array pairs so that each antenna array pair includes two antenna arrays that are electrically coupled to each other and that are spaced apart from each other so that the antenna array pairs form a reflected beam in response to an incident signal that is emitted in a direction corresponding to a source of the incident signal, and
wherein the step of printing each linear antenna array includes printing a plurality of patch antenna elements, each patch antenna element including a first port that is electrically coupled to a first wire and a second port, disposed orthogonally to the first port, that is electrically coupled to a second wire.

11. The method of claim 10, wherein the printing step comprises inkjet printing.

12. The method of claim 10, wherein the Van Atta array reflector comprises electrically conductive ink.

13. The method of claim 10, wherein the dielectric substrate comprises a flexible material.

14. The method of claim 13, wherein the flexible material comprises a polyimide film.

15. The method of claim 10, wherein the step of printing a Van Atta array reflector comprises the steps of:
(a) electrically coupling the first wire of a first linear antenna array in an antenna array pair to the first wire of a second linear antenna array in the antenna array pair; and
(b) electrically coupling the second wire of the first linear antenna array in the antenna array pair to the second wire of the second linear antenna array in the antenna array pair.

16. The method of claim 10, wherein the Van Atta array reflector is configured to generate a reflected signal in response to an incident signal in which the reflected signal has a polarization that is different from a polarization of the incident signal.

17. The method of claim 10, further comprising a protective layer disposed on the dielectric substrate and the Van Atta array reflector that is transparent to the radio frequency.

* * * * *